July 14, 1925. 1,546,194
H. BORNKESSEL
ASH SCREEN
Filed Jan. 23, 1925
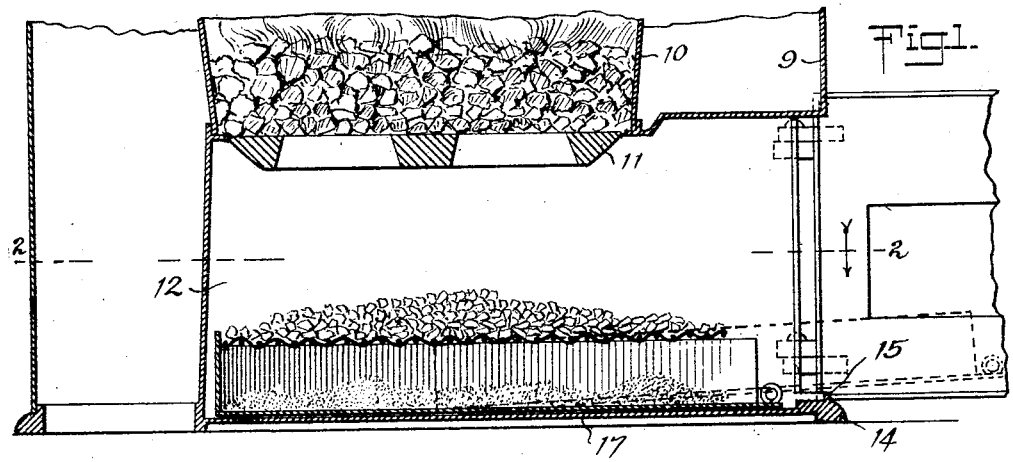
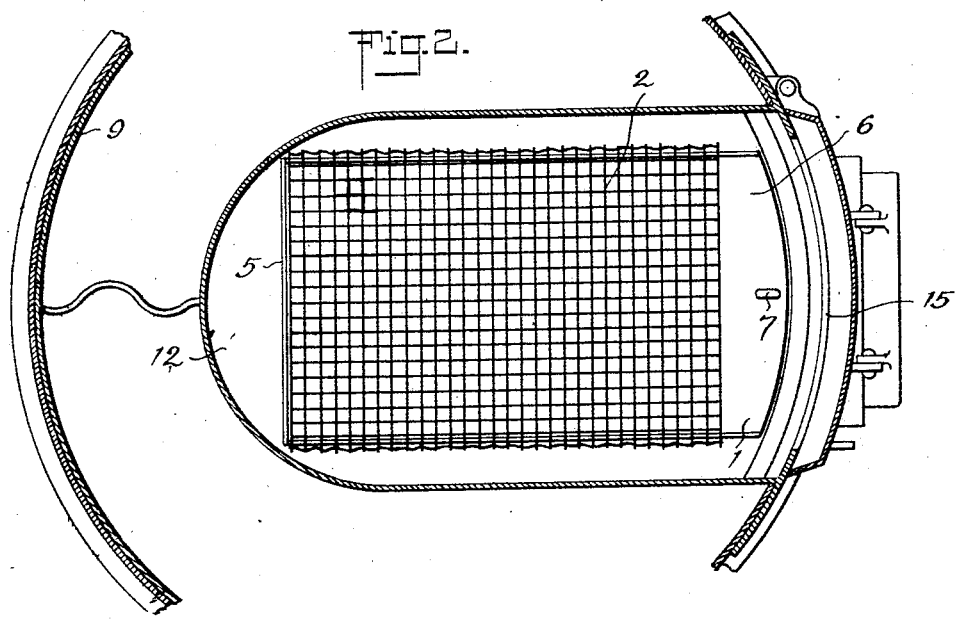
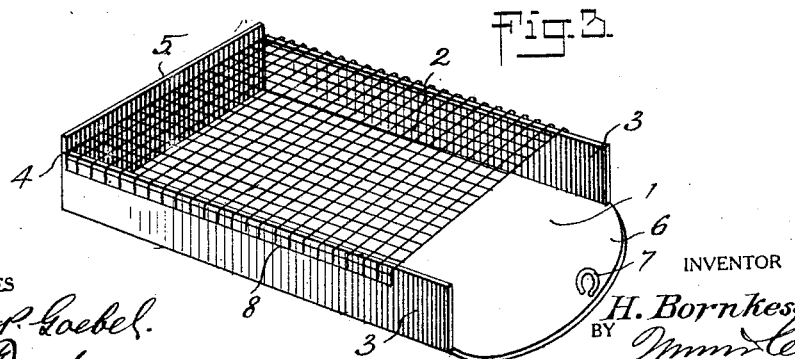
WITNESSES
INVENTOR
H. Bornkessel.
BY
ATTORNEYS Patented July 14, 1925.

1,546,194

UNITED STATES PATENT OFFICE.

HARRY BORNKESSEL, OF RICHMOND HILL, NEW YORK.

ASH SCREEN.

Application filed January 23, 1925. Serial No. 4,301.

*To all whom it may concern:*

Be it known that I, HARRY BORNKESSEL, a citizen of the United States, and a resident of the city of New York, Richmond Hill, borough of Queens, in the county of Queens and State of New York, have invented a new and Improved Ash Screen, of which the following is a full, clear, and exact description.

This invention relates to ash screens and more specifically to a combined ash sifter and receptacle, an object of the invention being to provide a device of this character which can be readily inserted into the ash pit of a furnace and the like, and which will serve not only as a collecting medium for the ashes to enable them to be conveniently removed from the ash pit but will also function to automatically sift the ashes, separating the cinders or larger particles from the finer ash, the latter collecting in the pan.

A further object is to provide a device or article of this character which includes a pan of novel construction having a removable screen thereon which as an assemblage is adapted to be located in the ash pit of a furnace so that the ashes will fall onto the screen, the finer particles passing through the screen into the pan while the larger particles remain on the screen, so that when the device is removed as an entirety the larger particles can be placed in one receptacle and the finer particles in another, thus avoiding the unpleasant duty of sifting the ashes, which operation is by my device performed automatically.

With these and other objects in view, the invention consists in certain novel features of construction and combinations and arrangements of parts which will be more fully hereinafter described and pointed out in the claims.

In the accompanying drawings—

Figure 1 is a view in vertical section, illustrating my improved device in operative position in the ash pit of a furnace;

Figure 2 is a view in horizontal section on the line 2—2 of Figure 1, the ashes, however, being omitted from the illustration;

Figure 3 is a perspective view of my improved device.

My improved ash sifter comprises a pan 1 and a screen 2. The pan 1 is preferably formed with upright side portions 3, 3 and an end portion 4 which is higher than the sides 3 so as to provide an upwardly projecting ledge or flange 5. The front end of the pan 1 is open and the bottom of the pan may have a forward extension 6 with a ring or hook 7 thereon to receive a poker or other device to facilitate the drawing or movement of the pan out of the furnace.

The screen 2 may be made of any suitable mesh and in any suitable manner and is located on top of the sides 3, 3 of the pan 1. This screen 2 is preferably formed with depending side portions 8 overlapping the sides 3 of the pan so as to prevent the screen from independent lateral movement.

It is to be understood that the screen 2 covers as much of the pan as desired and extends from the rear end thereof to the forward end to a point as near the forward end as desired.

The function of the flange or projection 5 on the rear end of the pan is to compel the screen to move outwardly through the pan when the latter is drawn from the furnace and also functions to a more or less limited degree to prevent the ashes from falling over the rear end of the device.

In Figure 1 I illustrate my improved device in operative position in an ordinary type of furnace 9. This furnace is shown as having a fire box 10 with a grate 11 at the bottom thereof and an ash pit 12 below the grate which is normally closed by a door 13.

Furnaces of this type, and practically all furnaces, in fact, have a door frame 14 which provides an upstanding ledge or sill 15 which is slightly higher than the bottom 17 of the ash pit 12, so that it is necessary to lift the forward end of the pan 1 before it can be drawn out of the furnace.

As clearly illustrated in Figure 1, the ashes fall directly from the grate 11 onto the screen 2, the fine powder passing through the screen into the pan 1 and the larger particles remaining on the screen.

When it is desired to remove the pan, the first operation is to insert a hook, such as a poker, into the eye or ring 7 and lift the forward end of the pan slightly, and then draw it forwardly a short distance, as indicated by the dotted line in Figure 1.

It is then desirable to allow the device to remain in this position for a few moments so that the draft of air entering the fire box will pass through the open front end of the pan 1, then upwardly through the screen and the ash so as to carry the dust upwardly into the furnace and aid in a further separation of the powder from the larger particles of the ash.

The pan can then be completely withdrawn, the larger particles moved bodily by lifting the screen 2 from the pan, and the fine ash can be poured out of the open front end of the pan into a receptacle. Any ash which may fall around the sides or back of the rear end of the device can be shoveled or otherwise removed from the ash pit and placed on the screen 2 so that this will be likewise sifted before the pan is again returned to the ash pit.

A preferable use is to allow the pan to remain in the ash pit except such times as the ashes are being disposed of. When the grate 11 is shaken to shake down the ashes, they are allowed to remain on the screen and in the pan until the furnace is again to be shaken so that they are fairly cool before handling.

While I have illustrated what I believe to be a preferred embodiment of my invention it is obvious that various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A device of the character described, comprising a pan having an open front end, a screen removably supported on the pan, said screen substantially flat and located in a plane substantially the same as the upper edges of the side walls of the pan and downwardly projecting side portions on the screen overlapping the sides of the pan and holding the screen against lateral displacement.

2. A device of the character described, comprising a pan having an open front end, a screen removably supported on the pan, said screen substantially flat and located in a plane substantially the same as the upper edges of the side walls of the pan and downwardly projecting side portions on the screen overlapping the sides of the pan and holding the screen against lateral displacement, said pan having an upwardly projecting inner end extending above the plane of the screen.

3. A device of the character described, comprising a pan having an open front end, a screen removably supported on the pan, said screen substantially flat and located in a plane substantially the same as the upper edges of the side walls of the pan, downwardly projecting side portions on the screen overlapping the sides of the pan and holding the screen against lateral displacement, the bottom of said pan projecting forwardly beyond the sides of the pan, and a hook receiving device on said forwardly projection portion of the pan.

HARRY BORNKESSEL.